US005567208A

United States Patent [19]

Larsson et al.

[11] Patent Number: 5,567,208

[45] Date of Patent: Oct. 22, 1996

[54] VENETIAN BLIND ASSEMBLY MACHINE LADDER GUIDE MECHANISM

[75] Inventors: Jeanette M. Larsson, Svanesund; Lars S. Gudmundson, Ödsmal, both of Sweden

[73] Assignee: Hunter Douglas International N.V., Netherlands Antilles

[21] Appl. No.: 405,545

[22] Filed: Mar. 16, 1995

[30] Foreign Application Priority Data

Mar. 21, 1994 [EP] European Pat. Off. ........... 94200704.8

[51] Int. Cl.[6] ..................................................... B23P 19/04

[52] U.S. Cl. ............................................................... 29/24.5

[58] Field of Search ................................. 29/24.5, 281.4, 29/281.5, 281.6, 701

[56] References Cited

U.S. PATENT DOCUMENTS

| | | | |
|---|---|---|---|
| 3,555,864 | 1/1971 | Wegner | 29/24.5 |
| 4,073,044 | 2/1978 | Edixhoven | 29/24.5 |
| 4,516,300 | 5/1985 | Gaillard et al. | 29/24.5 |
| 4,543,699 | 10/1985 | Anderson | 29/24.5 |
| 4,730,372 | 3/1988 | Tsuchida | 29/24.5 |
| 5,333,365 | 8/1994 | Marocco et al. | 29/24.5 |
| 5,349,730 | 9/1994 | Anderson et al. | 29/24.5 |

FOREIGN PATENT DOCUMENTS

| | | | |
|---|---|---|---|
| 0297759 | 1/1989 | European Pat. Off. | 29/24.5 |
| 713802 | 8/1954 | United Kingdom | 29/24.5 |
| 2253230 | 9/1992 | United Kingdom | 29/24.5 |
| 8504687 | 10/1985 | WIPO | 29/24.5 |

*Primary Examiner*—Peter Vo
*Attorney, Agent, or Firm*—Ralph F. Crandell; Gary M. Polumbus; Dorsey & Whitney LLP

[57] ABSTRACT

A ladder lacing unit (90) for a venetian blind assembly machine. The mechanism is formed by a movable carrier (102), with first and second ladder support guiding means (92) mounted on the carrier. A ladder support advancing means (98) is associated with each ladder support guiding means. Indexing means (90,104,204) are included for indexing the movable carrier (102) from a first position, in which the first ladder support guide means is accurately located to receive venetian blind slats, to a second position in which the second ladder support guide means is accurately so positioned.

10 Claims, 4 Drawing Sheets

VENETIAN BLIND ASSEMBLY MACHINE LADDER GUIDE MECHANISM

BACKGROUND OF THE INVENTION

1. Field of the Invention

The present invention relates to a venetian blind assembly machine ladder guide mechanism.

2. Description of the Prior Art

Various types of venetian blind assembly machines are known in which punched and cut slats are fed into a so-called "lacing section", in which the slats are fed into the gaps between the vertical cords of a venetian blind cord ladder and above the rungs thereof. Some ladders have double rungs, and the slats may sometimes be fed between the upper and lower cords of such a double rung.

An example of such a machine is shown in EP-B-133759. In this machine, two or more ladder support guides are provided to guide each ladder cord accurately to the correct position to receive the slats when they arrive. The positioning must be very exact as the slats are only provided with a very small "target", by the ladder, particularly with double rung ladders. Of course such a machine is relatively expensive and needs to be capable of being used for blinds of different sizes and types.

U.S. Pat. No. 4,526,300 discloses a ladder support guide change mechanism for a venetian blind assembly machine, said mechanism comprising a ladder support guiding means and a ladder support advancing means associated with said ladder support guiding means.

One of the major problems of known venetian blind assembly machines is that a rather long time is taken to set up different ladder support guides for a change of blind to be manufactured.

SUMMARY OF THE INVENTION

The present invention is characterised in that a movable carrier is provided, in that said ladder support guiding means includes at least a first and a second ladder support guide means mountable on said movable carrier and in that means are provided for indexing said movable carrier from a first position, in which said first ladder support guide means is accurately located in said assembly machine to receive venetian blind slats, to a second position in which said second ladder support guide means is accurately so positioned.

The mechanism of the present invention overcomes the afore-mentioned problem and the setting up of different ladder support guides can be effected very quickly and efficiently.

It is contemplated that the ladder support guide means could be mounted on a linearly movable carrier moved, when required, into the correct position.

According to another proposal of the invention, the movable carrier includes a swivel plate rotatably mounted on the carrier, the swivel plate being rotatable between the first and second positions, e.g. through 180°. Means will be provided to ensure that the swivel plate is actually accurately indexed to the correct position.

DETAILED DESCRIPTION OF THE DRAWINGS

Figure 1:
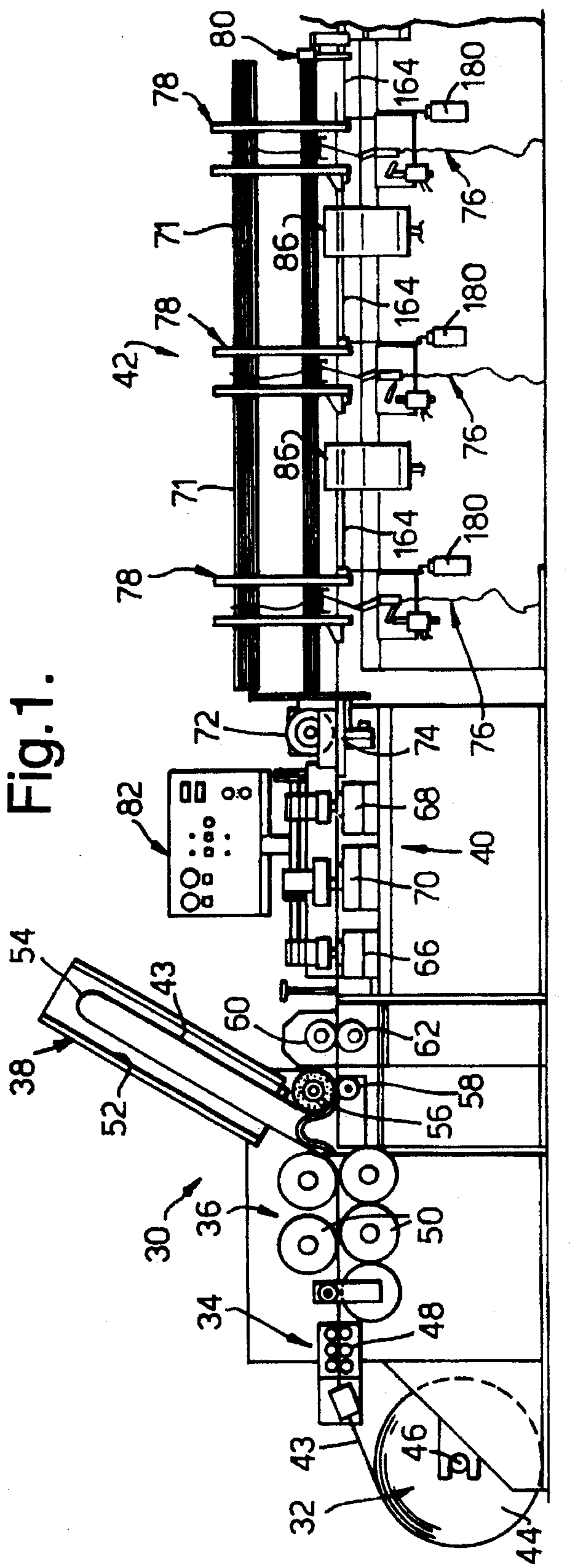
FIG. 1 is a somewhat schematic front elevation of a slat assembly apparatus embodying the present invention and showing various processing stations.
Figure 2:
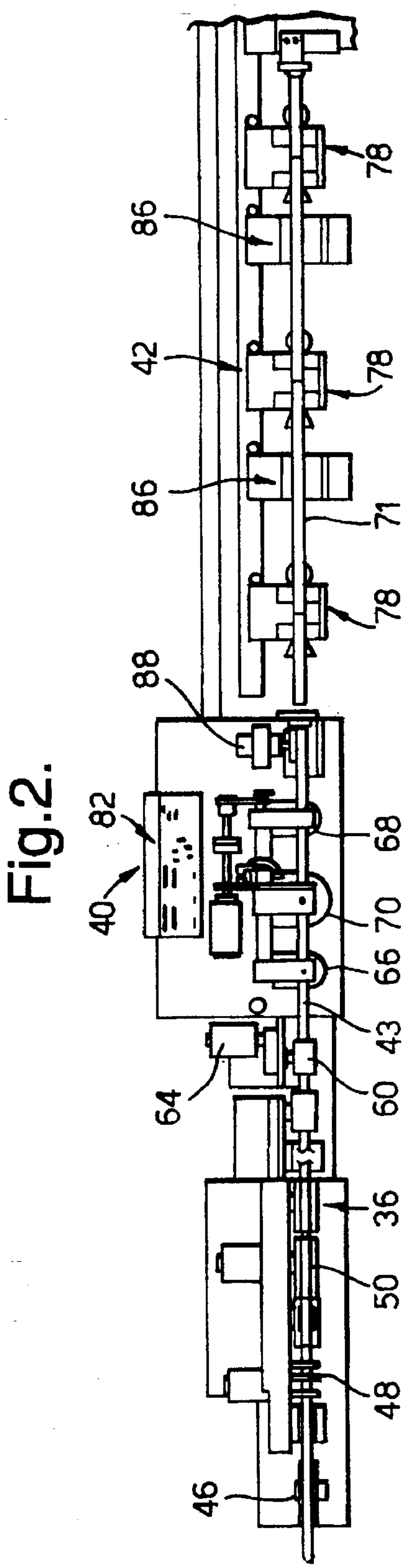
FIG. 2 is a partial top plan view of the apparatus of FIG. 1.

An apparatus 30 for assembling venetian blinds is illustrated in FIGS. 1 and 2. The apparatus includes a supply section 32, a levelling section 34, a forming section 36, an accumulator section 38, a punch and cut section 40, and a lacing section 42.

The general mechanical assembling of venetian blinds is generally known in the art and has been described in the United States patent publications U.S. Pat. Nos. 3,555,864 and 4,073,044 which are hereby incorporated by reference. The processing of slat material through each section of the apparatus 30 will therefore only be described generally.

Aluminium strip material 43 from which venetian blinds are made is typically supplied in rolls or coils 44 which are stored at the supply section 32 on a rotatable shaft 46. The leading end of the strip of material is fed through the levelling station 34. Offset rollers 48 are positioned to receive the strip material and reversely bend the material to remove the innate bend that results from storage in a coiled condition. After the levelling section 34, the strip material passes through a forming section 36 where mating concave and convex upper and lower form rollers 50 to create a transverse curvature in the strip material. An upwardly extending accumulator chamber 52 is provided at the accumulator section 38 so that a length of strip material can be stored in a loop 54. This storage is required to enable subsequent processing steps of the strip material to be intermittent.

From the accumulator station 38, the strip material passes between idler rollers 56 and 58 which may have a surface adapted to remove any irregularities from the surface of the strip material.

After passing through the accumulator station 38 and idler rollers 56 and 58 the strip is driven by drive wheels 60 and 62 one of which can be driven by an electric motor 64.

The drive wheels 60 and 62 cause the strip material to be fed at predetermined intervals into the punch and cut section 40, where first and second punches 66 and 68 are disposed upstream and downstream from a central cutter 70. The cutter 70 will cut the continuous strip into individual slats 71 of the required length. The punches 66 or 68 are adapted to punch holes (not shown) in the slat material strip for the accommodation of lift cords in the finished blind.

Coming from the cut and punch section 40, the strip material is fed by an outfeed drive roller 72 and outfeed back-up roller 74 towards the lacing section 42. Longitudinal movement of the slat material automatically feeds it through a plurality of a downstreamly spaced ladder lacing stations 78. In these ladder lacing stations 78 the slat material is laced into flexible ladder supports 76 which serve to interconnect the individual slats of a blind. Downstream of the last operative lacing station 78 or combined therewith is a stop 80 against which the leading end of each slat abuts.

A computerised control system housed in a control unit 82 may be designed automatically to accept information and process such information depending on parameters such as the required dimensions for the finished blind. It will also be appreciated that different sizes of slat width (generally 25 mm or 16 mm) and different color of blinds require different ladder supports. Depending on the number of ladder supports the number of lacing stations 78 that will be operative will be variable for each blind under construction. Such information is also accommodated by the computerised control system. Each lacing station 78, with the exception of the most upstream lacing station has a sensor 86 associated therewith. For clarity the sensors which may be photoelectric sensors have been illustrated schematically and separate from their associated lacing station 78, but it should be understood that these may also be integrated therewith, so as to form a single combined unit.

The lacing station and sensor combinations are each adjustably positionable along the lacing section 42 and may be activated or deactivated according to requirement.

The appropriate positioning and activation of the individual lacing stations 78 advantageously will be fully automatic and controlled by the computerised control unit 82.

The system employed in the assembly apparatus to guide the movement of the slats into the lacing stations and to support the weight of the slat material between the lacing stations includes a plurality of cables 164 that are substantially horizontally disposed and which extend between adjacent lacing stations 78.

To prevent the leading end of the slat material from dropping downwardly between the successive lacing stations, the cables 164 engage the leading end of a slat and guide it to the next lacing station 78.

Due to the transverse curvature of the slat material, the cables also provide lateral guidance for the moving slat material as the cables 164 engage the concave side of the slat material.

The cables 164 are anchored with one of their ends to an upstream lacing station and are each slidingly connected to an adjacent downstream lacing station.

The sliding connection allows for the distance between the lacing stations 78 to be variable and for the necessary length of cable 164 to be fed from a supply.

This supply is schematically indicated with a reference 180 and could comprise an additional supply of cable together with tensioning means for maintaining the required tension in the cable 164 for supporting the slats. Electronic encoder means 88 could be associated with for instance the outfeed rollers 72 and 74 to register the length of slat material fed into the lacing station 42. Such encoder signals are fed to the computerised control unit 82 for calculating and generating the relevant cut and punch signals as well as the signals to lift the slats 71 in the upper portion of the lacing stations 78 upon their assembly into the ladder supports 76.

Figure 3:
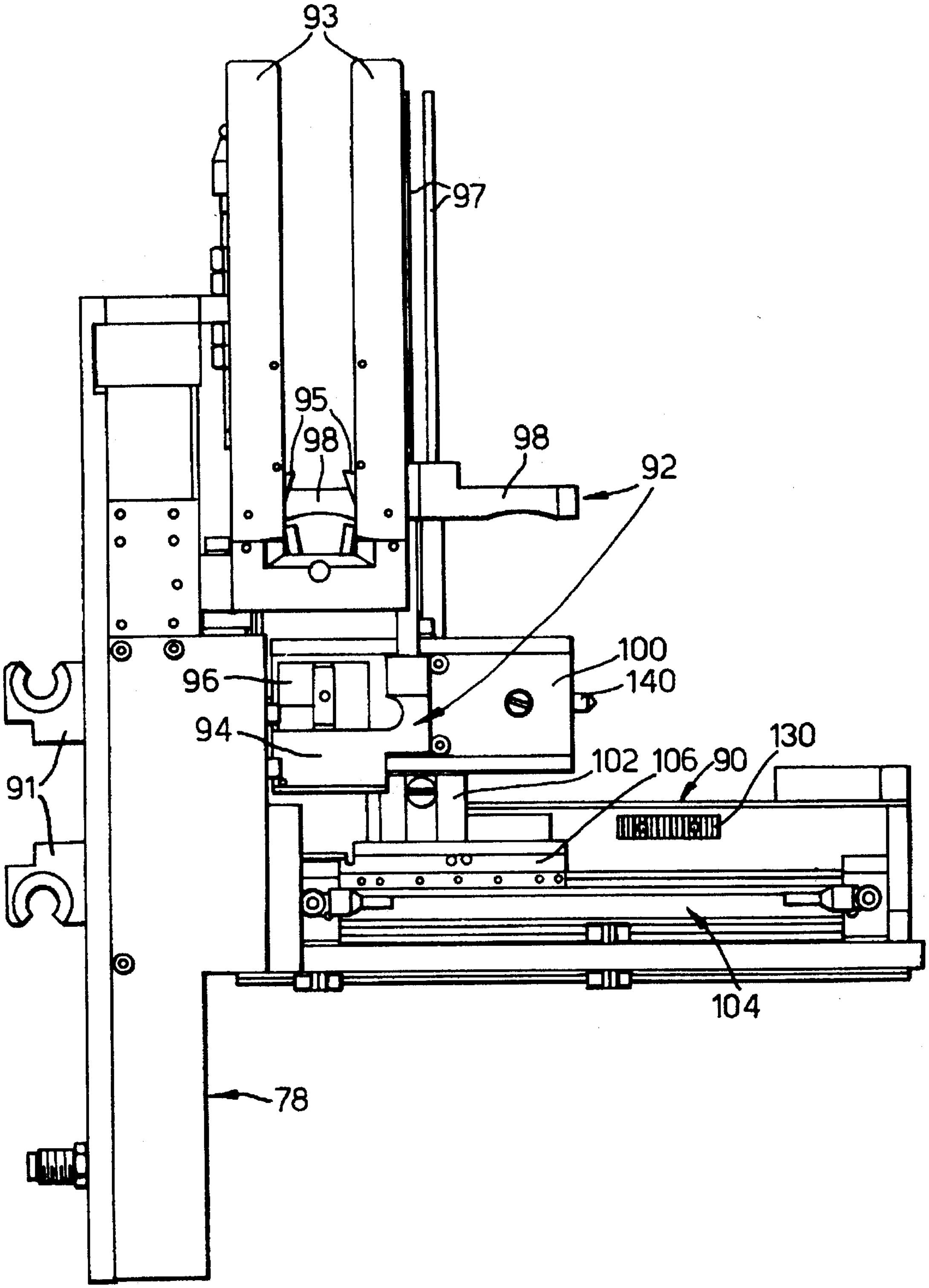
FIG. 3 is an elevation of a ladder lacing station viewed in the downstream direction of the slat feed path.

FIG. 3 illustrates the lacing station 78 in more detail and in particular to comprise a ladder support guide change mechanism or lacing unit 90 including an attachment mechanism 91 and two ladder support guides 92.

Figure 7:
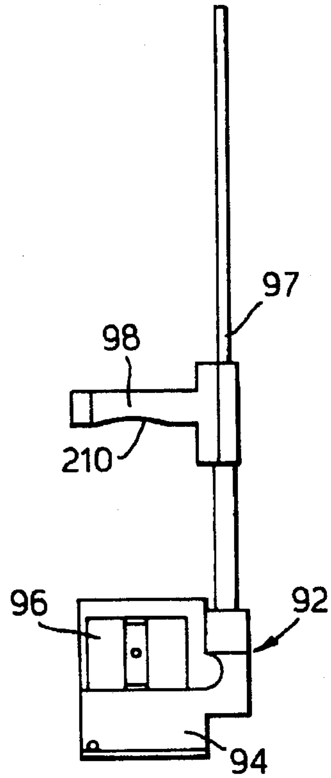
FIG. 7 is an elevation of a ladder support guide from the station of FIG. 3 on a somewhat enlarged scale.

A single ladder support guide 92 is illustrated in FIG. 7 and will be described in detail herein below with reference to FIG. 7. For the purpose of describing FIG. 3 it will suffice to indicate that each support guide 92 comprises a base part 94, a guide block 96 and a ladder support attachment fixture 98 which is raisable along vertical posts 97. The base parts

94 of the two ladder support guides 92 are attached to opposite sides of a swivel plate 100 of the guide change mechanism 90.

Generally it is seen in FIG. 3 that the lacing station 78 comprises an attachment mechanism or means 91 for attaching it to the lacing section 42 of the machine as schematically illustrated in FIGS. 1 and 2. Further the lacing station has a slat collecting tower 93 and slat stack supporting latches 95.

Figure 4:
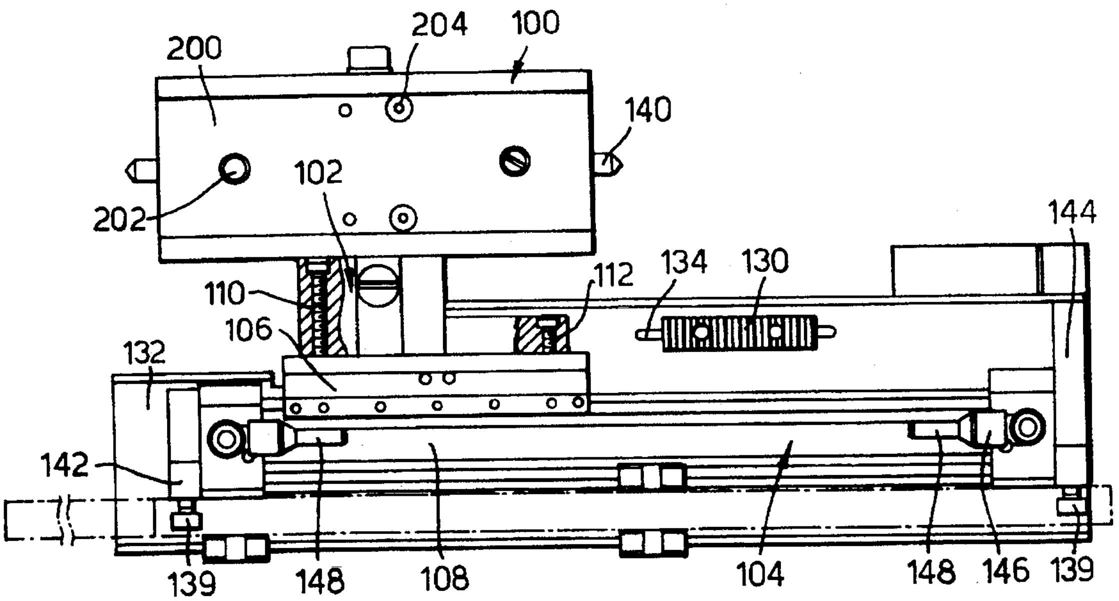
FIG. 4 is an elevation of the ladder support guide change mechanism from the station of FIG. 3 and viewed in the same direction.
Figure 5:
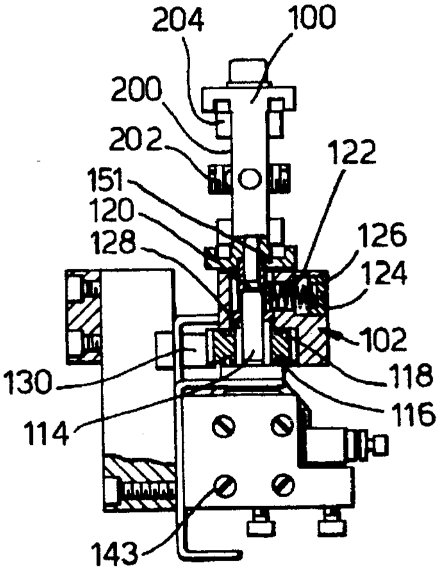
FIGS. 5 and 6 are an end elevation and a plan, respectively, of the change mechanism of FIG. 4.
Figure 6:
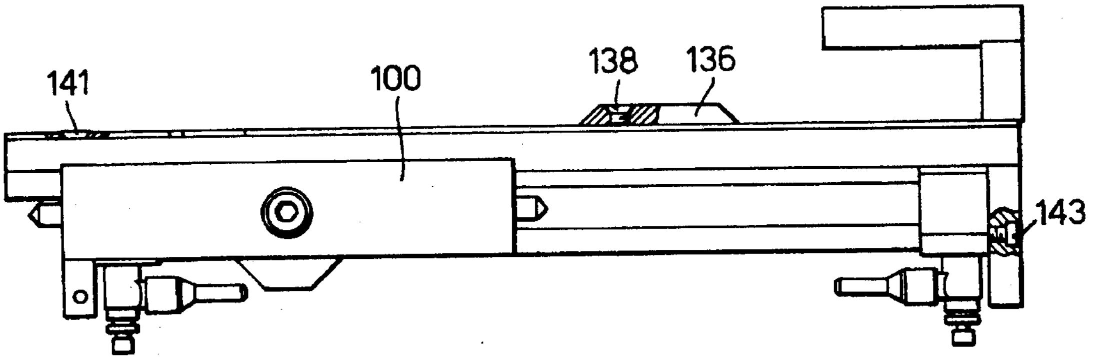

Turning now to FIGS. 4, 5 and 6 it is seen that the swivel plate 100 is pivotally mounted on a movable carrier bearing block 102. The movable carrier bearing block 102 is itself mounted on a linear actuator 104, which comprises a translating carriage 106 and an actuator body 108. In the illustrated embodiment the linear actuator 104 is in the form of a pneumatic cylinder, but it should be understood that this could also be either a hydraulic actuator or some electromagnetic device whatever may have preference. The carrier bearing block 102 is shown in more detail in FIG. 5 where the relevant portion has been sectioned to show its details.

The swivel plate 100 is mounted on a shaft 114 which is engaged in a one way clutch 116, concentrically of which is mounted a gear wheel 118. Above gear wheel 118 the shaft 114 is provided with an indexing collar 120 having indexing surfaces engageable by an indexing tappet 122. The indexing tappet 122 is spring biased towards its indexing position by a coil compression spring 124, which is pretensioned and retained by a screw plug 126.

The flat surfaces on the indexing collar correspond with the desired positions for the swivel plate 100. The indexing collar 120 is further conveniently provided with a retention flange 128 over which the indexing tappet 122 additionally engages to retain the swivel plate against upwardly directed forces.

It is further seen that alongside the path of movement of the bearing block 102 and within the path of movement of the gear wheel 118 there is a toothed rack 130. The toothed rack 130 is adjustably mounted on a frame member 132 by means of a slot 134, a retaining plate 136 and clamping screws 138 for adjustably clamping rack 130 with respect to slot 134. The frame member 132 can be attached to the cooperating structure as shown in FIG. 3 by attachment screws 139 and an index pin 140 on the swivel plate 100 registers removably with an aperture (not shown) in the cooperating structure of FIG. 3.

Frame member 132 additionally carries support elements 142 and 144 which carry the linear actuator 104 by means of fixing screws 143, the support elements 142 and 144 being affixed by screws 141 to the frame member 132.

Further FIGS. 4–6 show that the linear actuator 104 at each of its longitudinal ends is provided with a fluid line connector 146 and fluid line 148 which will be appropriately energised for forward movement and return translating movement of carriage 106 and bearing block 102. The swivel plate 100 is further provided with an accommodation cavity or recess 200 for receiving the base part 94 of the ladder support guide 92.

The swivel plate 100 is further provided with a spring biased retaining ball or detent 202 and abutment stops 204.

If necessary the swivel plate 100 may additionally pivot and rest on a friction washer 151 to dampen its swivel movement.

Reference is now made to FIG. 7 which illustrates the ladder support guide 92 in more detail.

The base part 94 is slid into one of two undercut cavities or channels 200, formed one on each face of swivel plate 100 until it is halted by the end stops 204 and retained by spring biased retaining ball 202. It will not be necessary to describe such an arrangement in more detail as similar exchangeable connections are well known in the mechanical art. On the base part 94 is provided a guide block 96 which actually guides and spreads the vertical members of a flexible ladder support 76 such as referred to in connection with FIGS. 1 and 2. The side members of such a ladder support need to be spread open as far as possible to allow lacing of a slat between subsequent cross rungs of such a ladder support. The top end of the ladder support will be temporarily affixed to the slidable fixture 98 which can descend along the vertical posts 97.

It can be seen that the lower side of the fixture 98 is provided with a concave recess 210 which will be contacted by the top most slat once inserted in the ladder supports.

Upon lifting the top most slat and every subsequent slat to a level above the supporting latches 95 (see FIG. 3) the fixture 98 will rise accordingly.

The ladder spreading and guiding blocks 96 can have many forms and additional ladder support guides 92 may be mounted on a swivel plate 100 or be exchanged and prepared during operation of the assembly machine for a next assembly job.

The operation of the device according to the present invention will now be described with reference to FIGS. 3 through 6.

During assembly of the machine the swivel plate 100 will take the position as illustrated in FIG. 3. Appropriate ladder support means (not shown) will be positioned in guide block 96 and the top end thereof will be removably attached to the fixture 98.

It is now possible to prepare the ladder support guide on the frontal end of the swivel plate which is then not in use.

Alternatively this ladder support guide can be exchanged against another for a different type of ladder support means.

If the assembly machine generates a signal to switch from one ladder support guide to another the linear actuator retracts the swivel plate 100 and its indexing pin 140 from the lacing station 78.

Further movement of the carriage 106 moves the carrier bearing block 102 in the direction of the toothed rack 130.

Upon passing the toothed rack 130 the gear wheel 118 will be engaged and rotated.

Rotation of gear wheel 118 upon retracting movement of the carrier bearing block 102 will turn the swivel plate 100 through 180°, so that the opposite swivel pin 140 will now face the machine frame.

While being in register with the toothed rack the swivel plate 100 is sufficiently remote from the machine structure to enable free rotation of the swivel plate 100.

Upon the end of stroke of the linear actuator 104 the rotation through 180° of the swivel plate 100 will be completed and the actuator 104 will be operated to effect a return stroke towards the machine.

The indexing collar 120 and tappet 122 will additionally assist in defining, ensuring and locking of the correct position of the swivel plate 100 upon its return stroke.

Engagement of the gear wheel 118 with the toothed rack 130 on the return stroke will not rotate the swivel plate 100 because the one way clutch 116 will now be disconnected from the shaft 114.

At the end of the return stroke, the opposite index pin 140 will be located in the machine structure and a next assembly job may be started.

It should be clear that alternatively one could also arrange for the swivel plate 100 to rotate on the return stroke rather than on the retracting stroke, which would only involve reversal of the one-way clutch 116.

It is also contemplated that the swivel plate could be caused to be indexed in an entirely different way. For example, the bearing block 102 could be fixed and the rack 130 could be mounted on a reciprocated carriage. Alternatively, the swivel plate could be rotated by an indexing or other form of rotary motor.

Furthermore, two (or even more) ladder support guide means could be mounted on a linearly movable carrier and moved, when required, into the correct position.

Such and other modifications are well known within the scope of the present invention. It is of utmost importance, however, whatever system is used, that the ladder support guide means should be positively indexed into the correct position.

We claim:

1. A ladder lacing unit for a venetian blind assembly machine, comprising a movable carrier, a first ladder support guiding means and a second ladder support guiding means mounted to said movable carrier, for selective activation, ladder support advancing means associated with each of said first and second ladder support guiding means and means for moving and indexing said movable carrier into a first position, in which said first ladder support guiding means is accurately located to receive venetian blind slat material, and in a second position in which said second ladder support guide means is accurately so positioned.

2. A ladder lacing unit as claimed in claim 1, in which said movable carrier comprises a swivel member rotatably mounted on said movable carrier, said swivel member being rotatable between said first position and said second position.

3. A ladder lacing unit as claimed in claim 2, wherein said first position is located at about 180° with respect to said second position.

4. A ladder lacing unit as claimed in claim 2 and further comprising a linearly movable actuator effective to move said movable carrier in opposite linear directions, a shaft mounted to said movable carrier, said swivel member being affixed to said shaft, a one way clutch and gear wheel mounted to said shaft, a toothed rack positioned to be engaged by said gear wheel when said movable carrier is moved in one of said opposite directions to rotate said movable carrier to a given one of said first and second positions and the swivel member therewith, said one way clutch being effective to allow said swivel member to remain in said given one position as said movable carrier is moved in the other of said opposite directions.

5. A ladder lacing unit as claimed in claim 4 and further comprising means adjustably mounting said toothed rack.

6. A ladder lacing unit as claimed in claim 2 and further comprising an indexing collar associated with said swivel member and at least one indexing tappet engaging surface portions on said indexing collar effective to retain said swivel member accurately in one of said first and second positions.

7. A ladder lacing unit as claimed in claim 6 and further comprising spring means urging said at least one tappet in engagement with said indexing collar.

8. A ladder lacing unit as claimed in claim 2 and further comprising means defining two undercut cavities, one on each of two faces of said swivel member and a base part on each of said first and second ladder support guiding means cooperatingly shaped with said undercut cavities effective to allow each said base part to be slidable into one of said undercut cavities.

9. A ladder lacing unit as claimed in claim 8 and further comprising an end stop associated with each undercut cavity effective to define a position in which said base part is located in its undercut cavity.

10. A venetian blind assembly machine including a ladder lacing unit comprising a movable carrier, a first ladder support guiding means and a second ladder support guiding means mounted to said movable carrier for selective activation, ladder support advancing means associated with each of said first and second ladder support guiding means and means for moving and indexing said movable carrier into a first position, in which said first ladder support guiding means is accurately located to receive venetian blind slat material, and in a second position in which said second ladder support guide means is accurately so positioned.

* * * * *